(12) United States Patent
Deeg et al.

(10) Patent No.: US 12,060,046 B2
(45) Date of Patent: Aug. 13, 2024

(54) RELAY VALVE DEVICE AND BRAKING DEVICE FOR A VEHICLE HAVING SUCH A RELAY VALVE DEVICE

(71) Applicant: Knorr-Bremse Systeme Fuer Nutzfahrzeuge GmbH, Munich (DE)

(72) Inventors: Markus Deeg, Eberdingen (DE); Michael Giannuzzi, Kirchheim am Neckar (DE); Friedbert Röther, Cleebronn (DE)

(73) Assignee: KNORR-BREMSE SYSTEME FUER NUTZFAHRZEUGE GMBH, Munich (DE)

( * ) Notice: Subject to any disclaimer, the term of this patent is extended or adjusted under 35 U.S.C. 154(b) by 0 days.

(21) Appl. No.: 17/589,070

(22) Filed: Jan. 31, 2022

(65) Prior Publication Data
US 2022/0250603 A1    Aug. 11, 2022

(30) Foreign Application Priority Data

Feb. 10, 2021   (DE) ..................... 10 2021 103 053.6

(51) Int. Cl.
   *B60T 15/18*    (2006.01)
(52) U.S. Cl.
   CPC .................................. *B60T 15/18* (2013.01)
(58) Field of Classification Search
   CPC ....... B60T 15/18; B60T 15/181; B60T 15/182
   USPC .......................................................... 303/40
   See application file for complete search history.

(56) References Cited

U.S. PATENT DOCUMENTS

| | | | |
|---|---|---|---|
| 10,179,579 B2 * | 1/2019 | Didwiszus | ............ B60T 15/027 |
| 10,427,663 B2 * | 10/2019 | Schnittger | ............ B60T 13/683 |
| 2022/0250603 A1 * | 8/2022 | Deeg | ....................... B60T 15/18 |

FOREIGN PATENT DOCUMENTS

| | | | | |
|---|---|---|---|---|
| DE | 3443079 | | 1/1986 | |
| DE | 102009040759 A1 * | | 3/2011 | ............ B60T 15/181 |
| EP | 1391363 A1 | | 2/2004 | |
| GB | 2083148 A * | | 3/1982 | ............ B60T 15/18 |
| JP | 2017522230 A | | 8/2017 | |
| WO | 2011/029495 A1 | | 3/2011 | |
| WO | WO-2011029495 A1 * | | 3/2011 | ............ B60T 15/18 |
| WO | WO-2021013491 A1 * | | 1/2021 | ............ B60T 13/26 |

* cited by examiner

*Primary Examiner* — Thomas J Williams
(74) *Attorney, Agent, or Firm* — NORTON ROSE FULBRIGHT US LLP; Gerard A. Messina

(57) ABSTRACT

A relay-valve (RV) device for commercial-vehicles, having: a relay-piston, in a housing, has a piston-pin (PP) extending in a longitudinal-direction (LD) from a piston-plate (PPL) and is movable in the LD in a PPL-guide, the PPL dividing a housing interior into a PP-side volume and a volume remote therefrom, a valve, which is actuated by the PP to introduce a fluid from a supply-pressure-reservoir into the PP-side volume, and an intermediate-element (IE), arranged around the PP is movable relative thereto in the LD in an IE-guide and which divides the PP-side volume into a PPL-side volume and a volume remote therefrom and limits the flow-rate of the fluid to the PPL by at least one through-opening, in which the RV device has an IE-stop, which limits the movement of the IE in the direction of the PPL and against which the IE is bringable into sealing contact by the fluid-pressure.

14 Claims, 1 Drawing Sheet

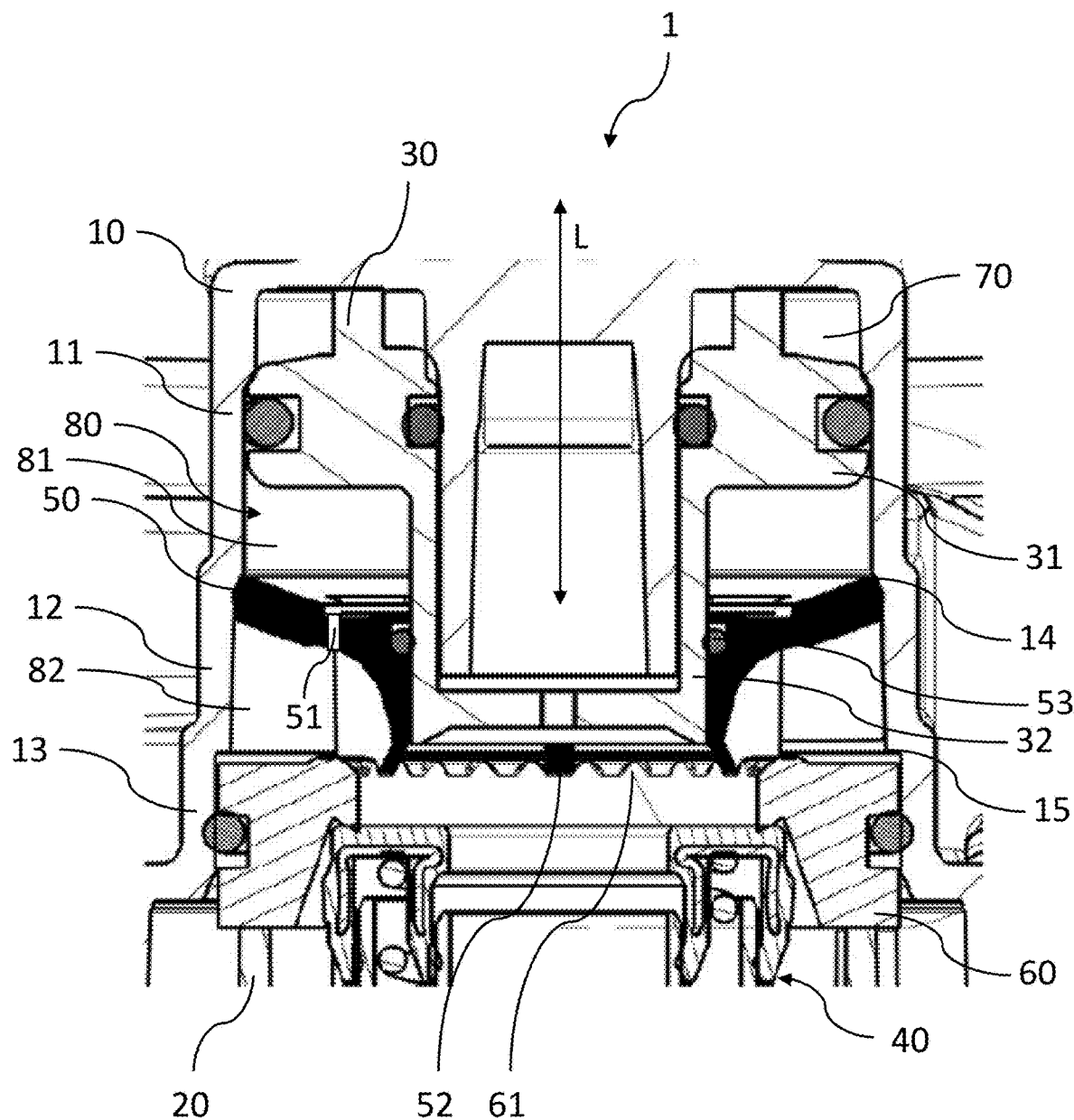

RELAY VALVE DEVICE AND BRAKING DEVICE FOR A VEHICLE HAVING SUCH A RELAY VALVE DEVICE

RELATED APPLICATION INFORMATION

The present application claims priority to and the benefit of German Patent Application No. 10 2021 103 053.6, which was filed in Germany on Feb. 10, 2021, the disclosure which is incorporated herein by reference.

FIELD OF THE INVENTION

The present invention relates to a relay valve device, in particular for commercial vehicles, and to a braking device for a vehicle, in particular for a commercial vehicle, having such a relay valve device.

BACKGROUND INFORMATION

Relay valve devices, such as proportional relay valves, are used, for examples, in vehicles for the metered transmission of compressed air to consumers, such as brake or air-suspension systems. In commercial vehicles, for example, they are also used in this context for EBS brake systems in order to specify the brake pressure for the brake cylinders in accordance with corresponding control.

One embodiment of a proportional relay valve for wheel and axle modulators of EBS brake systems is discussed in EP 1 391 363 A1, for example. In this proportional valve, an inlet valve can be opened by a relay piston, which can be moved by a control pressure, in order to introduce a supply pressure into a relay working chamber. An intermediate element with an orifice is provided between the piston plate of the relay piston and the relay working chamber in order to delay a pressure equalization between the supply pressure and the control pressure. In order to control the time delay exclusively via the orifice and to avoid turbulence, the intermediate element is sealed with respect to the piston pin of the relay piston and the housing wall in each case by a sealing element. The sealing elements are subject to wear due to the changing pressure conditions and the associated relative movements or at least the effects of force, which can have effects on leaktightness.

SUMMARY OF THE INVENTION

In view of what has been stated above, it is therefore an object of the present invention to provide a relay valve device and a braking device having such a relay valve device in which at least one seal can be made between the intermediate element and the housing without an additional sealing element.

The object may be achieved by a relay valve device and a braking device for a vehicle having such a relay device according to the independent claims. Advantageous developments of the present invention are contained in the further descriptions herein.

According to the present invention, a relay valve device, in particular for commercial vehicles, has a relay piston, which is arranged in a housing, has a piston pin extending in a longitudinal direction from a piston plate and can be moved in the longitudinal direction in a piston plate guide, wherein the piston plate divides an interior of the housing into a volume on the piston pin side and a volume remote from the piston pin, a valve means, which can be actuated by the piston pin in order to be able to introduce a fluid from a supply pressure reservoir into the volume on the piston pin side, and an intermediate element, which is arranged around the piston pin and can be moved relative thereto in the longitudinal direction in an intermediate element guide and which in turn divides the volume on the piston pin side into a volume on the piston plate side and a volume remote from the piston plate and limits the flow rate of the fluid to the piston plate by at least one through opening, wherein the relay valve device has an intermediate element stop, which limits the movement of the intermediate element in the direction of the piston plate and against which the intermediate element can be brought into sealing contact by the fluid pressure.

In this case, the relay piston is moved in the longitudinal direction in the piston plate guide in a direction away from the volume remote from the piston pin, for example by a control pressure, which is applied to the piston plate in the volume remote from the piston pin. In the case of contact with the valve means, for example by contact of a piston pin end section remote from the piston plate with a valve means surface which faces the remote piston pin end section, and corresponding above movement or further movement of the relay valve, the valve means can open a fluid connection from the supply pressure reservoir to the volume on the piston pin side. That volume of the volume on the piston pin side which is remote from the piston plate can have a consumer connection, via which the supply pressure can be passed on to a consumer, such as a brake cylinder. For pressure equalization between the control pressure applied in the volume remote from the piston pin and the supply pressure applied in the volume on the piston pin side, the intermediate element has at least one through opening. By the configuration of this at least one through opening of the intermediate element, the flow rate of the fluid introduced from the supply pressure reservoir can be regulated to a flow rate which delays the pressure equalization by a predetermined time. In order to avoid vibrations and associated noise generation and/or associated material stresses, the relay valve device is configured in such a way that the intermediate element can be pressed against the intermediate element stop by the fluid pressure of the fluid introduced from the supply pressure reservoir in order to be brought into sealing contact with said stop. Such a seal does not have to be completely fluidtight, but can also be sealed only to such an extent that a residual fluid permeability does not make a significant contribution to the excitation of vibrations and the associated noise generation and/or material stresses in relation to predetermined tolerances. The use of such a seal between the intermediate element and the intermediate element stop by the fluid pressure applied to the intermediate element in the volume remote from the piston plate makes it possible to dispense with a sealing element for sealing at this location.

In one embodiment, the intermediate element is of plane-parallel or oblique configuration in a region for bearing against the intermediate element stop.

Here, a plane-parallel configuration refers to a parallel configuration of the stop surface of the intermediate element to the stop surface of the intermediate element stop in order to form the largest possible contact surface for sealing. In the case of an oblique configuration of the stop region of the intermediate element, at least one stop point for sealing can be obtained, virtually independently of the configuration of the stop region of the intermediate element stop.

According to a further development, the relay valve device has a sealing element, which is provided in such a way that the intermediate element can be sealed off with respect to the piston pin by the sealing element.

In a manner comparable to the intermediate element stop, the seal between the intermediate element arranged around the piston pin and the piston pin by the sealing element prevents a significant introduction of the fluid from the supply pressure reservoir into the volume on the piston plate side outside the at least one through opening provided for this purpose. In this case, too, the seal does not have to be completely fluidtight but can be limited to sealing according to requirements as per the statements above.

In particular, the seal by the sealing element is configured in such a way that the piston pin can be moved in the longitudinal direction relative to the intermediate element, with the result that the seal between the intermediate element and the piston pin by the sealing element is independent of the contact of the intermediate element with an intermediate element stop.

In particular, the intermediate element stop is formed by the housing.

In principle, the intermediate element is to be sealed radially inward with respect to the piston pin and in a radially outer region with respect to the intermediate element guide, in particular in relation to the longitudinal direction, in order to restrict the introduction of fluid into the volume on the piston plate side substantially to the at least one through opening. In this case, the intermediate element stop may be provided at least for sealing relative to the radially outer region with respect to the intermediate element guide since this sealing is independent of the movement of the relay piston.

As a result of the formation of the intermediate element stop by the housing, the radially outer region with respect to the intermediate element guide can be formed in a simple manner. Here, sealing is not accomplished by surfaces which are in each case radial in relation to the longitudinal direction but by surfaces of the housing, which forms the intermediate element stop, and of the intermediate element which are located on one another or opposite one another in the longitudinal direction. As an alternative or in addition to an intermediate element stop formed by the housing, the intermediate element stop or at least one section of the intermediate element stop can also be formed by an intermediate element stop element which is mounted, for example, resiliently on the piston plate side facing the volume on the piston pin side.

According to a further development, the intermediate element guide is set back relative to the piston plate guide in a radial direction away from the piston pin in relation to the longitudinal direction in order to form the intermediate element stop, with the result that the transition between the piston plate guide and the intermediate element guide forms a shoulder as an intermediate element stop.

In this case, the housing directly or indirectly forms the intermediate element guide and the piston plate guide. As a result of the setting back of the intermediate element guide relative to the piston plate guide in the radial direction away from the piston pin in relation to the longitudinal direction, the intermediate element stop is thus produced as a shoulder which limits the movement of the intermediate element toward the piston plate in the longitudinal direction and, when a corresponding pressure is applied in the direction of the piston plate, brings the intermediate element into sealing contact with the intermediate element stop. Alternatively, it is also possible for the housing to form the intermediate element stop by a projection that points radially inward toward the piston pin at some other point.

In one embodiment, the relay valve device has an intermediate element seat, which can be moved in the longitudinal direction in an intermediate element seat guide and is arranged between the valve means and the intermediate element, and wherein the intermediate element seat is configured in such a way that the intermediate element seat can be brought into contact with the intermediate element at least in some section or sections and the intermediate element seat can bring the intermediate element into sealing contact with the intermediate element stop by the fluid pressure.

The contact of the intermediate element against the intermediate element stop is thus assisted by the fluid pressure of the fluid from the supply pressure reservoir acting on a side of the intermediate element seat facing away from the intermediate element in the longitudinal direction and by the associated movement of the intermediate element seat in the longitudinal direction in the direction of the intermediate element. In other words, the intermediate element is pressed against the intermediate element stop via the intermediate element seat.

Contact between the intermediate element seat and the intermediate element only in some section or sections makes it possible for regions of the volume on the piston pin side to be sealed off from one another by the contact of the intermediate element seat with the intermediate element. It is thus possible, for example, with the valve means open, for the fluid to be passed from the supply pressure reservoir through the sections which are not in contact in order to reach a consumer connection and/or the at least one through opening of the intermediate element, for example. As an alternative or in addition, a corresponding passage can also be provided via at least one through opening in the intermediate element and/or in the intermediate element seat.

In one embodiment, the intermediate element seat can be embodied in one piece with the intermediate element. The intermediate element seat and the intermediate element can accordingly be moved jointly in this embodiment. In other words, the intermediate element can be configured in such a way that, on a side facing away from the piston plate, it has an end section which corresponds to an intermediate element seat, for example making possible the sealing with the valve means described below.

In particular, the relay valve device is configured in such a way that the intermediate element seat is sealingly seated on the valve means in a position of the relay piston in which the valve means is not actuated.

The intermediate element seat thus serves not only to transfer the intermediate element into contact with the intermediate element stop but can also seal off the volume on the piston pin side from the supply pressure reservoir.

According to a further development, the relay valve device has an intermediate element seat stop on the intermediate element side, which limits the movement of the intermediate element seat in the direction of the intermediate element and against which the intermediate element seat can be brought into contact by the fluid pressure.

As a result of the limitation of the movement of the intermediate element seat toward the intermediate element in the longitudinal direction associated with the intermediate element seat stop on the intermediate element side, the force which can be exerted on the intermediate element is likewise limited. The intermediate element can thus be pressed against the intermediate element stop by the intermediate element seat only with a predetermined maximum force. As a result, signs of wear and/or damage to the intermediate element and/or intermediate element stop can be prevented. In other words, the intermediate element seat stop on the intermediate element side can be used as overload protection for the intermediate element and/or the intermediate element stop.

In particular, the intermediate element seat stop on the intermediate element side is formed by the housing.

In a manner comparable to the formation of the intermediate element stop, the intermediate element seat stop on the intermediate element side can also be formed in a simple manner by the housing.

The intermediate element seat guide may be set back relative to the intermediate element guide in a radial direction away from the piston pin in relation to the longitudinal direction in order to form the intermediate element seat stop on the intermediate element side, with the result that the transition between the intermediate element guide and the intermediate element seat guide forms a shoulder as an intermediate element seat stop on the intermediate element side.

In this case, likewise in a manner comparable to the intermediate element stop, the housing directly or indirectly forms the intermediate element seat guide and the intermediate element guide. As a result of the setting back of the intermediate element seat guide relative to the intermediate element guide in the radial direction away from the piston pin in relation to the longitudinal direction, the intermediate element seat stop on the intermediate element side is thus produced as a shoulder which limits the movement of the intermediate element seat toward the intermediate element in the longitudinal direction and, when a corresponding pressure is applied in the direction of the intermediate element, brings the intermediate element seat into contact with the intermediate element seat stop on the intermediate element side. Alternatively, it is also possible for the housing to form the intermediate element seat stop on the intermediate element side by a projection that points radially inward in the direction of the piston pin at some other point.

According to a further development, the maximum distance of the intermediate element from the intermediate element stop in the longitudinal direction is less than or equal to the maximum distance of the intermediate element seat from the intermediate element seat stop on the intermediate element side.

Accordingly, the intermediate element seat can only be brought into contact with the intermediate element seat stop on the intermediate element side when the intermediate element can also be brought into contact with the intermediate element stop. In other words, the movement of the intermediate element seat in the direction of the intermediate element is limited by the intermediate element seat stop on the intermediate element side at the earliest when the intermediate element has been brought into contact with the intermediate element stop by the intermediate element seat.

The maximum distance of the intermediate element from the intermediate element stop may be less than the maximum distance of the intermediate element seat from the intermediate element seat stop on the intermediate element side. It is thereby possible to ensure not only that the intermediate element can be brought into contact with the intermediate element stop by the intermediate element seat but also, by a further movement of the intermediate element seat, that the contact of the intermediate element against the intermediate element stop can be subjected to pressure in order to improve the sealing.

In one embodiment, the relay valve device has an intermediate element seat stop which is remote from the intermediate element and which limits the movement of the intermediate element seat in a direction away from the intermediate element.

The intermediate element seat stop remote from the intermediate element thus limits the movement of the intermediate element seat in a direction away from the intermediate element stop on the intermediate element side. In terms of the above maximum distance of the intermediate element seat from the intermediate element seat stop on the intermediate element side, this maximum distance can be defined by the intermediate element seat stop remote from the intermediate element.

The intermediate element seat stop remote from the intermediate element can be used, in particular, to limit the necessary movement of the intermediate element seat in order to bring the intermediate element into contact with the intermediate element stop, irrespective of the pressure conditions. By virtue of the distance thereby set, the intermediate element can be brought into contact with the intermediate element stop in a predetermined period of time via the intermediate element seat.

Alternatively or in addition, the relay valve device can be configured in such a way that, when in contact with the intermediate element seat stop remote from the intermediate element, the intermediate element seat is sealingly seated on the valve means in a position of the relay piston in which the valve means is not actuated. If the relay piston now moves the valve means in the longitudinal direction in a direction opposite to the volume remote from the piston pin, the intermediate element seat cannot be taken along owing to the intermediate element seat stop remote from the intermediate element. By virtue of the resulting spacing between the intermediate element seat and the valve means, a fluid can be introduced from the supply pressure reservoir into the volume on the piston pin side. The intermediate element seat can thus interact with the valve means in order to introduce the fluid from the supply pressure reservoir and end the introduction process.

In particular, the intermediate element seat stop remote from the intermediate element is formed by at least one stop pin.

By virtue of the configuration as at least one stop pin, the intermediate element seat stop remote from the intermediate element takes up comparatively little space, thus leaving a volume on the supply pressure reservoir side substantially unaffected. If such a stop pin is not formed integrally with the housing, it can also be easily exchangeable. In order to be able to set a length of the stop pin as required, the stop pin can also have a thread, at least in some section or sections, on an end remote from the intermediate element seat, which thread can be screwed to different depths, for example, into a stop pin receptacle, such as a housing wall.

According to a further development, the intermediate element seat and the intermediate element each have at least one contour section on mutually opposite sides, wherein the contour sections are configured in such a way that they can be brought into mutual form-fitting contact in relation to the longitudinal direction in order to form an anti-rotation means.

Introduction of the fluid from the supply pressure reservoir into the volume on the piston pin side may lead to turbulence, which may twist the intermediate element and/or the intermediate element seat relative to one another in relation to the longitudinal direction. By mutually corresponding contour sections of the intermediate element and of the intermediate element seat, which can be brought into engagement at least when pressure is applied by the fluid from the supply pressure reservoir, this can be prevented by the associated anti-rotation means. Corresponding contour sections can be configured, for example, as paired teeth or pairs of pins and pin receptacles. In the case of fully circumferential contour formation on the part of the intermediate element and/or of the intermediate element seat, the intermediate element and the intermediate element seat do not necessarily have to be moved beforehand into a relative engagement position with respect to one another, or more possibilities of orientation are obtained. In addition, the contour sections can also be configured in such a way that, in addition to the form-fitting connection, they also form at least one opening for the transfer of fluid between the intermediate element and the intermediate element seat.

A further aspect of the present invention relates to a braking device for a vehicle, in particular a commercial vehicle, wherein the braking device has at least one relay valve device according to the above statements.

The way in which the relay valve device for the braking device is used can be obtained by analogy with the advantages mentioned above.

The present invention is explained in greater detail below with reference to the appended FIGURE.

BRIEF DESCRIPTION OF THE DRAWING

FIG. 1 shows a schematic sectional view of a relay valve device according to one exemplary embodiment of the present invention.

DETAILED DESCRIPTION

FIG. 1 shows a schematic sectional view of a relay valve device 1 according to the present invention in a longitudinal direction L according to one exemplary embodiment of the present invention. The relay device 1 has a housing 10, in which a relay piston 30 is arranged so as to be movable in the longitudinal direction L. The relay piston 30 has a piston plate 31, by which the relay piston 30 is guided for movement in the longitudinal direction L in a piston plate guide 11 formed by the housing 10. From the piston plate 31, a piston pin 32 extends in the longitudinal direction L in the direction of a valve means 40. During a movement of the relay piston 30 in the longitudinal direction, the relay piston 30 is also guided by a piston pin guide 16 via the piston pin 32 on a side which is located radially on the inside in relation to the longitudinal direction L. The piston plate 31 can be sealed off with respect to the piston plate guide 11 by a seal and divides the housing volume into a volume 70 remote from the piston pin and a volume 80 on the piston pin side.

To actuate the valve means 40, compressed air, e.g. a control pressure in the case of a relay valve for brakes, can be introduced into the volume 70 remote from the piston pin. The compressed air acts on the piston plate 31, as a result of which the relay piston 30 is moved in the longitudinal direction L in the direction of the valve means 40. Once the end of the piston pin 32 remote from the piston plate 31 reaches the valve means 40 and is moved further, the valve means is taken along in the direction of movement of the relay piston 30. This opens a fluid connection between the valve means 40 and an intermediate element seat 60, which will be described later, to the volume 80 on the piston pin side. Via the fluid connection, a supply pressure, for example, can be introduced into the volume 80 on the piston pin side, which supply pressure can be passed on to a consumer, such as a braking device, via a connection (not illustrated here).

For a time delay of the pressure equalization between the volume 70 remote from the piston pin and the volume 80 on the piston pin side in order to avoid vibrations and associated damage and/or noise generation, an intermediate element 50 is used. The intermediate element 50 is arranged in the form of a ring around the piston pin 32 and divides the volume 80 on the piston pin side into a volume 81 on the piston plate side and a volume 82 remote from the piston plate. The volume 81 on the piston plate side and the volume 82 remote from the piston plate are in fluid communication via a through opening 51 formed in the intermediate element 50. Since, in relation to the longitudinal direction L, the intermediate element 50 is sealed radially with respect to the piston pin 32 by a sealing element 53 and can be moved in an intermediate element guide 12 in the longitudinal direction L and thus against an intermediate element stop 14, the intermediate element 50 acts as a restrictor or orifice for delaying the pressure equalization. In other words, the time delay of the pressure equalization can be substantially predetermined by the configuration of the through opening 51. By the intermediate element stop 14 formed by the housing 10 between the piston plate guide 11 and the intermediate element guide 12, the intermediate element 50 is adequately sealed with respect to the housing, and therefore further sealing elements can be dispensed with in this region.

The movement of the intermediate element 50 in the longitudinal direction L is limited in a direction toward the piston plate 31 by the intermediate element stop 14 and in a direction away from the piston plate 31 by the intermediate element seat 60. Here, the intermediate element seat 60 is of annular configuration and is guided so as to be movable in the longitudinal direction L in an intermediate element seat guide 13 formed by the housing 10. The movement of the intermediate element seat 60 in the longitudinal direction L is limited in a direction toward the intermediate element 50 by an intermediate element seat stop 15 on the intermediate element side and in a direction away from the intermediate element 50 by an intermediate element seat stop 20 remote from the intermediate element, the latter stop here being formed by stop pins. The intermediate element seat stop 20 remote from the intermediate element prevents the intermediate element seat 60 from moving along with the valve means 40 in the longitudinal direction L to such an extent that the fluid connection to the volume on the piston pin side cannot open for the supply pressure. The intermediate element seat stop 15 on the intermediate element side limits the contact pressure forces which can be transmitted to the intermediate element 50 through the intermediate element seat 60 in order to avoid any resulting damage to the intermediate element 50 and/or intermediate element seat 60. To ensure adequate sealing, the maximum distance of the intermediate element 50 from the intermediate element stop 14 in the longitudinal direction L is less than or equal to the maximum distance of the intermediate element seat 60 from the intermediate element seat stop 15 on the intermediate element side.

In addition, the intermediate element seat 60 has a contour section 61 on its side facing the intermediate element 50. The contour section 61 of the intermediate element seat 60 can be brought into contact with a corresponding contour section 52 of the intermediate element 50. By the corresponding contour sections, which engage in each other when in contact, the intermediate element 50 and the intermediate element seat 60 can be held secure against rotation with respect to one another in relation to the longitudinal direction L. Here, the contour sections 52 and 61 are configured as paired teeth. The intermediate element seat 60 has, for example, a continuous toothed structure running around in a uniform manner as contour section 61. That contour section 52 of the intermediate element 50 which faces the intermediate element seat 60 has corresponding teeth for this purpose. However, these teeth are not continuous all the way around but are spaced apart from one another in such a way that toothed structures of contour section 61 remain free when the intermediate element seat 60 is resting against the intermediate element 50. This creates a fluid connection to the volume 80 on the piston pin side for a supply pressure which can be introduced via the valve means 40.

The present invention is not restricted to the embodiments described. Even if only one through opening is shown in the above-described embodiment, it is also possible, for example, for a plurality of through openings to be provided. The intermediate element stop 14 can also be formed by an annular gap which is radial in relation to the longitudinal direction L. In addition, the sealing element 53 can also be omitted, for example, or a seal can be replaced by a comparatively narrow gap seal. Alternatively or in addition, an intermediate element stop can also be formed by the piston pin 32, that is to say on a side of the intermediate element 50 which is located radially on the inside in relation to the longitudinal direction L. For this purpose, the piston pin 32 can have a section which is set back radially inward in relation to the longitudinal direction L or can have a projection which points radially outward. Even if the relay piston device 1 in the embodiment described has an intermediate element 50 and an intermediate element seat 60 separate therefrom, the intermediate element 50 and the intermediate element seat 60 can also be formed in one piece, irrespective of further configuration features.

For example, the one-piece combination of the intermediate element 50 and the intermediate element seat 60 according to FIG. 1 can then be moved jointly in the longitudinal direction L between an end position toward the piston plate 31, which is determined by the intermediate element stop 14, and an end position away from the piston plate 31, which is determined by the intermediate element seat stop 20 remote from the intermediate element.

THE LIST OF REFERENCE SIGNS IS AS FOLLOWS 1 relay valve device
10 housing
11 piston plate guide
12 intermediate element guide
13 intermediate element seat guide
14 intermediate element stop
15 intermediate element seat stop on the intermediate element side
16 piston pin guide
20 intermediate element seat stop (stop pin) remote from the intermediate element
30 relay piston
31 piston plate
32 piston pins
40 valve means
50 intermediate element
51 through opening
52 contour section (intermediate element)
53 sealing element
60 intermediate element seat
61 contour section (intermediate element seat)
70 volume remote from the piston pin
80 volume on the piston pin side
81 volume on the piston plate side
82 volume remote from the piston plate
L longitudinal direction

What is claimed is:

1. A relay valve device for a commercial vehicle, comprising:
    a relay piston, which is arranged in a housing, having a piston pin extending in a longitudinal direction from a piston plate and is movable in the longitudinal direction in a piston plate guide, wherein the piston plate divides an interior of the housing into a volume on the piston pin side and a piston pin averted volume, which is a volume remote from the piston pin;
    a valve means, which is actuated by the piston pin, for introducing a fluid from a supply pressure reservoir into the volume on the piston pin side;
    an intermediate element, which is arranged around the piston pin and is movable relative thereto in the longitudinal direction in an intermediate element guide, which divides the volume on the piston pin side into a volume on the piston plate side and a volume remote from the piston plate and limits the flow rate of the fluid to the piston plate by at least one through opening; and
    an intermediate element stop, which limits the movement of the intermediate element in the direction of the piston plate and against which the intermediate element is bringable into sealing contact by the fluid pressure; and
    an intermediate element seat stop, which is remote from the intermediate element and which limits the movement of an intermediate element seat in a direction away from the intermediate element;
    wherein the relay valve device includes the intermediate element seat, which is movable in the longitudinal direction in an intermediate element seat guide and is arranged between the valve means and the intermediate element.

2. The relay valve device of claim 1, wherein the intermediate element has a plane-parallel configuration or an oblique configuration in a region for bearing against the intermediate element stop.

3. The relay valve device of claim 1, wherein the relay valve device has a sealing element, which is provided so that the intermediate element is sealable off with respect to the piston pin by the sealing element.

4. The relay valve device of claim 1, wherein the intermediate element stop is formed by the housing.

5. The relay valve device of claim 4, wherein the intermediate element guide is set back relative to the piston plate guide in a radial direction away from the piston pin in relation to the longitudinal direction to form the intermediate element stop, so that the transition between the piston plate guide and the intermediate element guide forms a shoulder as the intermediate element stop.

6. The relay valve device of claim 1, wherein the intermediate element seat is configured so that the intermediate element seat is bringable into contact with the intermediate element at least in a section or some sections.

7. The relay valve device of claim 6, wherein the intermediate element seat is sealingly seated on the valve means in a position of the relay piston in which the valve means is not actuated.

8. The relay valve device of claim 6, wherein the relay valve device has another intermediate element seat stop on the intermediate element side, which limits the movement of the intermediate element seat in the direction of the intermediate element and against which the intermediate element seat is brought into contact by the fluid pressure.

9. The relay valve device of claim 8, wherein the another intermediate element seat stop on the intermediate element side is formed by the housing.

10. The relay valve device of claim 9, wherein the intermediate element seat guide is set back relative to the intermediate element guide in a radial direction away from the piston pin in relation to the longitudinal direction to form the another intermediate element seat stop on the intermediate element side, with the result that the transition between the intermediate element guide and the intermediate element seat guide forms a shoulder as the another intermediate element seat stop on the intermediate element side.

11. The relay valve device of claim 8, wherein the maximum distance of the intermediate element from the intermediate element stop in the longitudinal direction is less than or equal to the maximum distance of the intermediate element seat from the another intermediate element seat stop on the intermediate element side.

12. The relay valve device of claim 6, wherein the intermediate element seat stop remote from the intermediate element is formed by at least one stop pin.

13. The relay valve device of claim 6, wherein the intermediate element seat and the intermediate element each have at least one contour section on mutually opposite sides, and the contour sections are configured so that they are bringable into mutual form-fitting contact in relation to the longitudinal direction to form an anti-rotation means, a relay piston, which is arranged in a housing, having a piston pin extending in a longitudinal direction from a piston plate and is movable in the longitudinal direction in a piston plate guide, wherein the piston plate divides an interior of the housing into a volume on the piston pin side and a piston pin averted volume, which is a volume remote from the piston pin.

14. A braking device for a vehicle for a commercial vehicle, comprising: at least one relay valve device, including:
a relay piston, which is arranged in a housing, having a piston pin extending in a longitudinal direction from a piston plate and is movable in the longitudinal direction in a piston plate guide, wherein the piston plate divides an interior of the housing into a volume on the piston pin side and a piston pin averted volume, which is a volume remote from the piston pin;
a valve means, which is actuated by the piston pin, for introducing a fluid from a supply pressure reservoir into the volume on the piston pin side;
an intermediate element, which is arranged around the piston pin and is movable relative thereto in the longitudinal direction in an intermediate element guide and which divides the volume on the piston pin side into a volume on the piston plate side and a volume remote from the piston plate and limits the flow rate of the fluid to the piston plate by at least one through opening; and
an intermediate element seat stop, which is remote from the intermediate element and which limits the movement of an intermediate element seat in a direction away from the intermediate element;
wherein the relay valve device includes the intermediate element seat, which is movable in the longitudinal direction in an intermediate element seat guide and is arranged between the valve means and the intermediate element, and
wherein the intermediate element stop limits the movement of the intermediate element in the direction of the piston plate and against which the intermediate element is bringable into sealing contact by the fluid pressure.

* * * * *